United States Patent
Wada et al.

(10) Patent No.: US 11,808,476 B2
(45) Date of Patent: Nov. 7, 2023

(54) RELAY UNIT HEAT EXCHANGER

(71) Applicant: Mitsubishi Electric Corporation, Tokyo (JP)

(72) Inventors: Nobuhiro Wada, Tokyo (JP); Kimitaka Kadowaki, Tokyo (JP); Yuji Motomura, Tokyo (JP); Yasushi Okoshi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 423 days.

(21) Appl. No.: 17/263,678

(22) PCT Filed: Sep. 21, 2018

(86) PCT No.: PCT/JP2018/034975
§ 371 (c)(1),
(2) Date: Jan. 27, 2021

(87) PCT Pub. No.: WO2020/059106
PCT Pub. Date: Mar. 26, 2020

(65) Prior Publication Data
US 2021/0215383 A1   Jul. 15, 2021

(51) Int. Cl.
*F24F 11/83* (2018.01)
*F24F 1/32* (2011.01)

(52) U.S. Cl.
CPC ............... *F24F 11/83* (2018.01); *F24F 1/32* (2013.01)

(58) Field of Classification Search
CPC . F24F 11/83; F24F 1/32; F25B 25/005; F25B 2700/2104
See application file for complete search history.

(56) References Cited

U.S. PATENT DOCUMENTS

2016/0245539 A1*   8/2016   Motomura ............... F24F 11/84

FOREIGN PATENT DOCUMENTS

| CN | 102112814 A | 6/2011 |
|---|---|---|
| JP | 2012-117778 A | 6/2012 |
| JP | 2017-101855 A | 6/2017 |
| WO | 2010109618 A1 | 9/2010 |
| WO | WO 2010 109618 * | 9/2010 |
| WO | 2017142026 A1 | 8/2017 |

OTHER PUBLICATIONS

Extended European Search Report dated Aug. 20, 2021, issued in corresponding European Patent Application No. 18934307.2.
Office Action dated Dec. 3, 2021 issued in corresponding CN patent application No. 201880097539.X (and English translation).
International Search Report of the International Searching Authority dated Nov. 6, 2018 for the corresponding international application No. PCT/JP2018/034975 (and English translation).

* cited by examiner

*Primary Examiner* — Henry T Crenshaw
(74) *Attorney, Agent, or Firm* — POSZ LAW GROUP, PLC

(57) ABSTRACT

A relay includes a first relay unit and a second relay unit provided between an outdoor unit and an indoor unit to allow refrigerant to circulate between the first relay unit and the outdoor unit and between the second relay unit and the outdoor unit, and a heat medium circuit connecting the first relay unit and the second relay unit to the indoor unit to allow a heat medium to circulate through the heat medium circuit. The second relay unit is installed above or on a top of the first relay unit.

11 Claims, 10 Drawing Sheets

Comparative Example

RELAY UNIT HEAT EXCHANGER

CROSS REFERENCE TO RELATED APPLICATION

This application is a U.S. national stage application of PCT/JP2018/034975 filed on Sep. 21, 2018, the contents of which are incorporated herein by reference.

TECHNICAL FIELD

The present disclosure relates to a relay provided between an outdoor unit and an indoor unit.

BACKGROUND ART

Some air-conditioning apparatus is disclosed with a configuration in which a relay is provided between an outdoor unit and an indoor unit, and the relay includes a pump to deliver a heat medium having exchanged heat with refrigerant to the indoor unit (see, for example, Patent Literature 1).

CITATION LIST

Patent Literature

Patent Literature 1: Japanese Unexamined Patent Application Publication No. 2017-101855

SUMMARY OF INVENTION

Technical Problem

In the air-conditioning apparatus disclosed in Patent Literature 1, the pump in the relay needs to have increased horsepower to increase the flow rate for supplying a heat medium to the indoor unit. In this case, the installation area of the relay increases in proportion to the horsepower of the pump.

The present disclosure has been achieved to solve the above problems, and it is an object of the present disclosure to provide a relay that increases the flow rate for supplying a heat medium, and avoids an increase in the installation area of the relay.

Solution to Problem

A relay of an embodiment of the present disclosure includes a first relay unit and a second relay unit provided between an outdoor unit and an indoor unit to allow refrigerant to circulate between the first relay unit and the outdoor unit and between the second relay unit and the outdoor unit, and a heat medium circuit connecting the first relay unit and the second relay unit to the indoor unit to allow a heat medium to circulate through the heat medium circuit. The second relay unit is installed above or on a top of the first relay unit.

Advantageous Effects of Invention

According to an embodiment of the present disclosure, two relay units are used, so that the flow rate for supplying a heat medium can be increased. In addition, as the two relay units are installed in a direction perpendicular to the floor surface, an increase in the installation area can be avoided.

DESCRIPTION OF EMBODIMENTS

Embodiment 1

Figure 1:
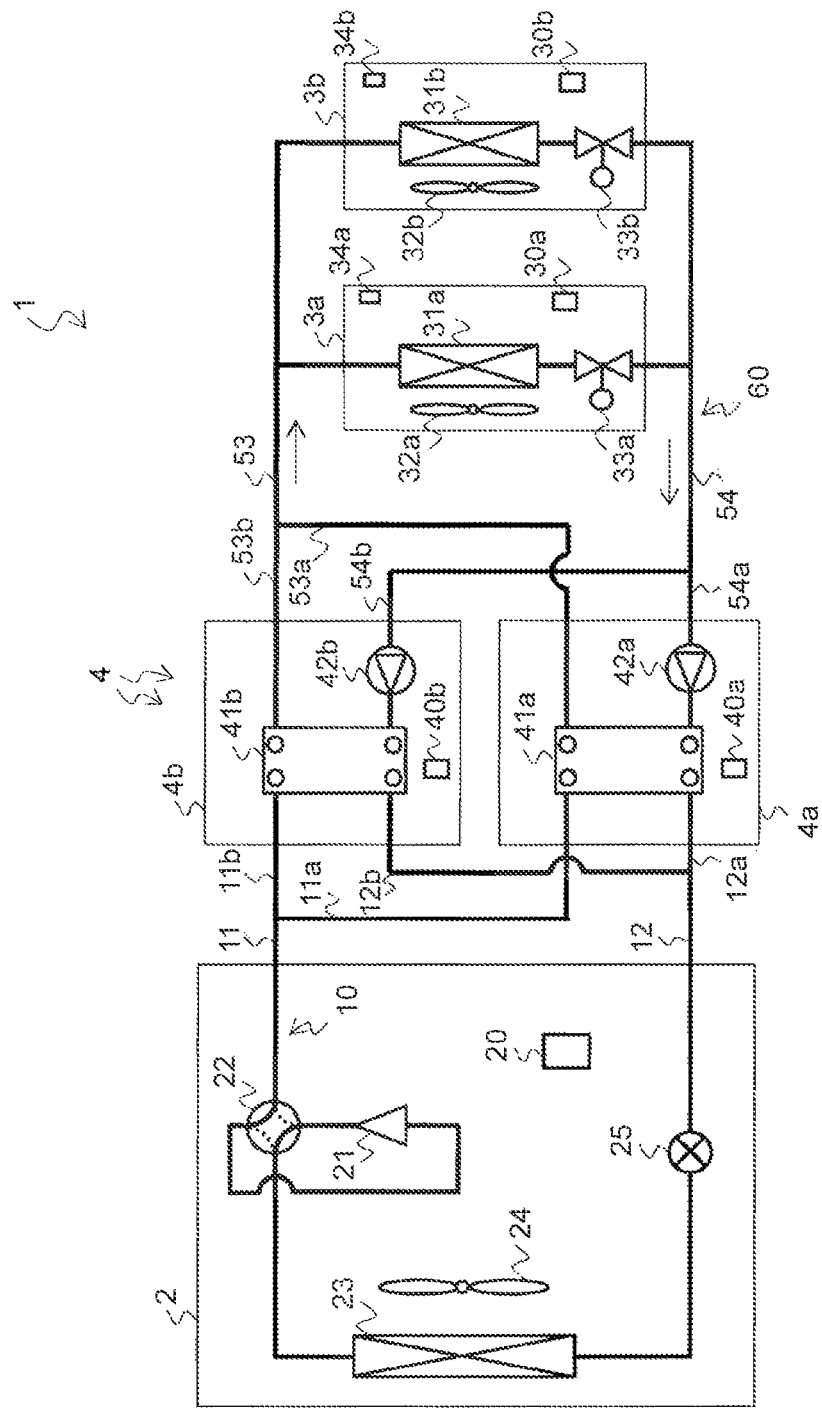
FIG. 1 is a circuit diagram illustrating a configuration example of an air-conditioning apparatus including a relay according to Embodiment 1 of the present disclosure.

A configuration of a relay according to Embodiment 1 of the present disclosure is described below. FIG. 1 is a circuit diagram illustrating a configuration example of an air-conditioning apparatus including a relay according to Embodiment 1 of the present disclosure. An air-conditioning apparatus 1 includes an outdoor unit 2, indoor units 3a and 3b, and a relay 4. The relay 4 is provided between the outdoor unit 2 and the indoor units 3a and 3b. The relay 4 allows refrigerant to circulate between the relay 4 and the outdoor unit 2, and allows a heat medium that does not involve a phase change to circulate between the relay 4 and the indoor units 3a and 3b. Examples of the heat medium that does not involve a phase change include water and brine. The relay 4 includes a first relay unit 4a and a second relay unit 4b.

In Embodiment 1, a case is described where the air-conditioning apparatus 1 includes one outdoor unit 2. However, the air-conditioning apparatus 1 may include a plurality of outdoor units 2. In Embodiment 1, a case where the air-conditioning apparatus 1 includes two indoor units, that is, the indoor units 3a and 3b is described. However, the air-conditioning apparatus 1 may include one indoor unit, or include three or more indoor units.

The outdoor unit 2 includes a compressor 21 configured to compress and discharge refrigerant, a flow-path switching device 22 configured to change the flow direction of refrigerant, a heat-source-side heat exchanger 23 that exchanges heat between refrigerant and outside air, a heat-source-side fan 24, an expansion device 25 configured to decompress and expand refrigerant, and a controller 20. The heat-source-side fan 24 supplies outside air to the heat-source-side heat exchanger 23. The indoor unit 3a includes a load-side heat exchanger 31a that exchanges heat between a heat medium and air in a room, a load-side fan 32a configured to supply air in a room to the load-side heat exchanger 31a, a flow-rate adjustment device 33a configured to adjust the flow rate of a heat medium, and a control unit 30a. The indoor unit 3a is provided with a room temperature sensor 34a configured to detect a temperature in a room that is an air-conditioned space. The indoor unit 3b includes a load-side heat exchanger 31b that exchanges heat between a heat medium and air in a room, a load-side fan 32b configured to supply air in a room to the load-side heat exchanger 31b, a flow-rate adjustment device 33b configured to adjust the flow rate of a heat medium, and a control unit 30b. The indoor unit 3b is provided with a room temperature sensor 34b configured to detect a temperature in a room that is an air-conditioned space.

The compressor 21 is, for example, a capacity-controllable inverter compressor. The flow-path switching device 22 changes a flow path of refrigerant depending on an operational mode such as heating operation and cooling operation. The flow-path switching device 22 is, for example, a four-way valve. The expansion device 25 can control the opening degree to any degree, and can adjust the flow rate of refrigerant. The expansion device 25 is, for example, an electronic expansion valve. The heat-source-side heat exchanger 23, and the load-side heat exchangers 31a and 31b are each, for example, a fin-and-tube heat exchanger.

The compressor 21, the heat-source-side heat exchanger 23, the expansion device 25, and the first heat-medium heat exchanger 41a are connected to form a refrigerant circuit 10 through which refrigerant circulates. The refrigerant circuit 10 is also formed in a circuit in which the compressor 21, the heat-source-side heat exchanger 23, the expansion device 25, and the second heat-medium heat exchanger 41b are connected.

The first relay unit 4a includes the first heat-medium heat exchanger 41a that exchanges heat between refrigerant and a heat medium, a first pump 42a configured to circulate a heat medium between the first relay unit 4a and the indoor units 3a and 3b, and a control unit 40a. The second relay unit 4b includes the second heat-medium heat exchanger 41b that exchanges heat between refrigerant and a heat medium, a second pump 42b configured to circulate a heat medium between the second relay unit 4b and the indoor units 3a and 3b, and a control unit 40b. The first heat-medium heat exchanger 41a and the second heat-medium heat exchanger 41b are each, for example, a plate heat exchanger. Each of the first pump 42a and the second pump 42b has horsepower of 120 kW or less.

A refrigerant pipe 11 is connected to the flow-path switching device 22 in the outdoor unit 2. The refrigerant pipe 11 is branched into a first refrigerant pipe 11a and a second refrigerant pipe 11b. The first refrigerant pipe 11a is connected to the first heat-medium heat exchanger 41a. The second refrigerant pipe 11b is connected to the second heat-medium heat exchanger 41b. A refrigerant pipe 12 is connected to the expansion device 25 in the outdoor unit 2. The refrigerant pipe 12 is branched into a first refrigerant pipe 12a and a second refrigerant pipe 12b. The first refrigerant pipe 12a is connected to the first heat-medium heat exchanger 41a. The second refrigerant pipe 12b is connected to the second heat-medium heat exchanger 41b.

First heat medium pipes 53a and 54a are connected to the first heat-medium heat exchanger 41a. Second heat medium pipes 53b and 54b are connected to the second heat-medium heat exchanger 41b. A heat medium pipe 53, formed by connecting the first heat medium pipe 53a and the second heat medium pipe 53b, is connected to the load-side heat exchangers 31a and 31b. A heat medium pipe 54, formed by connecting the first heat medium pipe 54a and the second heat medium pipe 54b, is connected to the flow-rate adjustment devices 33a and 33b.

The first heat-medium heat exchanger 41a, one or both of the load-side heat exchangers 31a and 31b, and the first pump 42a are connected to form a heat medium circuit 60 through which a heat medium circulates. The heat medium circuit 60 is also formed in a circuit in which the second heat-medium heat exchanger 41b, one or both of the load-side heat exchangers 31a and 31b, and the second pump 42b are connected. The heat medium circuit 60 is formed from a sealed pipe.

Figure 2:
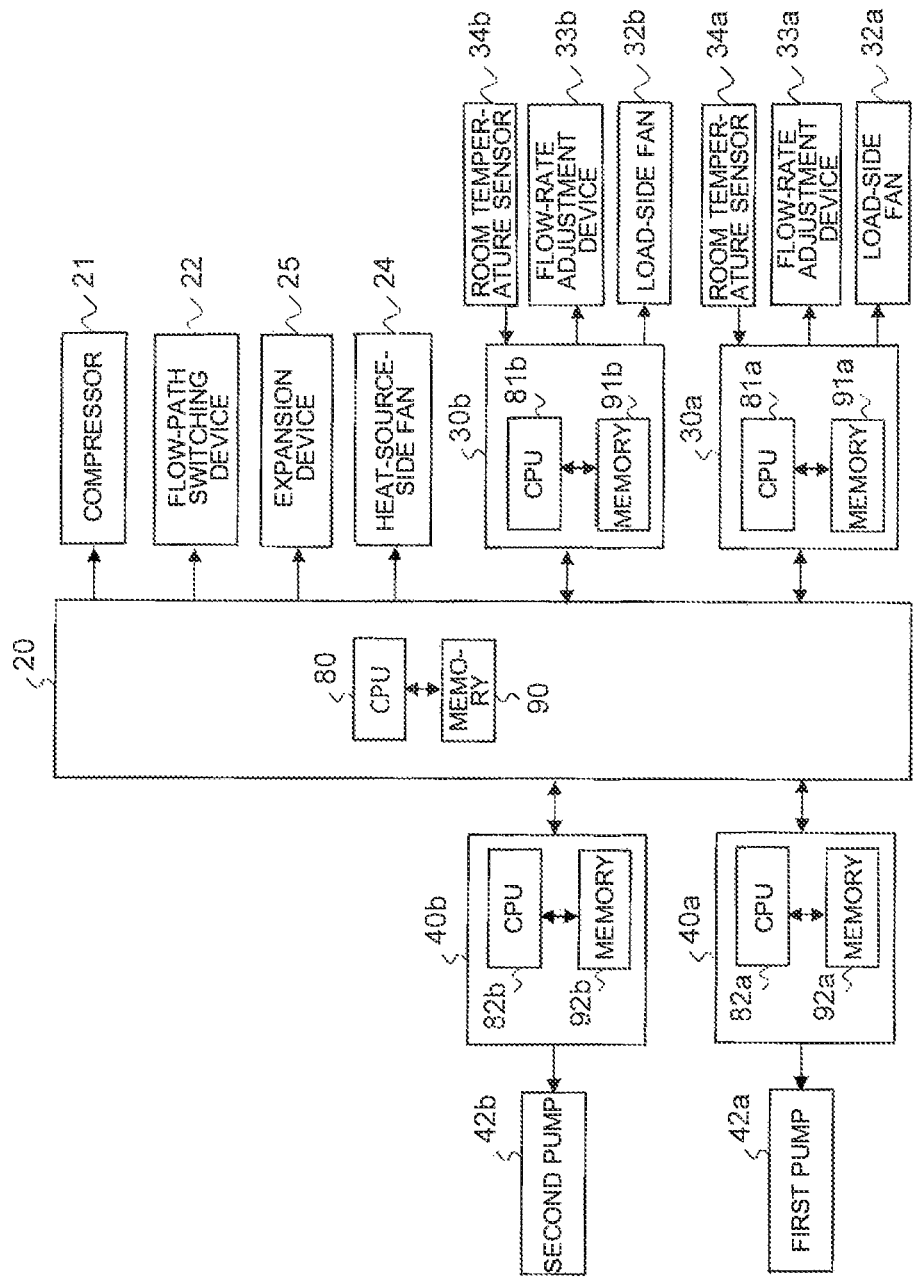
FIG. 2 illustrates a configuration related to control to be exercised by the air-conditioning apparatus illustrated in FIG. 1.

FIG. 2 illustrates a configuration related to control to be exercised by the air-conditioning apparatus illustrated in FIG. 1. The controller 20 includes a memory 90 configured to store programs in the memory 90, and a central processing unit (CPU) 80 configured to execute the programs. The controller 20 controls the flow-path switching device 22 depending on a set operational mode. The controller 20 controls a refrigeration cycle of refrigerant circulating through the refrigerant circuit 10 such that a value detected by the room temperature sensor 34a approaches a set temperature Tsa, and a value detected by the room temperature sensor 34b approaches a set temperature Tsb. For example, the set temperature Tsa is set by a user who uses the indoor unit 3a, while the set temperature Tsb is set by a user who uses the indoor unit 3b.

The controller 20 transmits control signals for controlling the flow-rate adjustment device 33a and the load-side fan 32a to the control unit 30a, and transmits control signals for controlling the flow-rate adjustment device 33b and the load-side fan 32b to the control unit 30b. The controller 20 transmits a control signal for controlling the first pump 42a to the control unit 40a, and transmits a control signal for controlling the second pump 42b to the control unit 40b.

The control unit 30a includes a memory 91a configured to store programs in the memory 91a, and a CPU 81a configured to execute the programs. The control unit 30a transmits a value detected by the room temperature sensor 34a and a value of the set temperature Tsa to the controller 20. The control unit 30a controls the flow-rate adjustment device 33a and the load-side fan 32a in accordance with the control signals received from the controller 20. The control unit 30b includes a memory 91b configured to store programs in the memory 91*b*, and a CPU 81*b* configured to execute the programs. The control unit 30*b* transmits a value detected by the room temperature sensor 34*b* and a value of the set temperature Tsb to the controller 20. The control unit 30*b* controls the flow-rate adjustment device 33*b* and the load-side fan 32*b* in accordance with the control signals received from the controller 20.

The control unit 40*a* includes a memory 92*a* configured to store programs in the memory 92*a*, and a CPU 82*a* configured to execute the programs. The control unit 40*a* controls the first pump 42*a* in accordance with the control signal received from the controller 20. The control unit 40*b* includes a memory 92*b* configured to store programs in the memory 92*b*, and a CPU 82*b* configured to execute the programs. The control unit 40*b* controls the second pump 42*b* in accordance with the control signal received from the controller 20. Note that the controller 20 may be configured to operate the same as the control units 30*a*, 30*b*, 40*a*, and 40*b*.

A case is described below where the air-conditioning apparatus 1 illustrated in FIG. 1 performs cooling operation. For simplicity of description, a case is described below where the indoor unit 3*a* performs cooling operation. The controller 20 sets a flow path of the flow-path switching device 22 such that refrigerant discharged from the compressor 21 flows into the heat-source-side heat exchanger 23. Refrigerant at low temperature and low pressure is compressed by the compressor 21 into gas refrigerant at high temperature and high pressure, which is discharged from the compressor 21. The gas refrigerant discharged from the compressor 21 flows into the heat-source-side heat exchanger 23 via the flow-path switching device 22. The refrigerant having flowed into the heat-source-side heat exchanger 23 transfers heat to the outside air supplied from the heat-source-side fan 24, at the heat-source-side heat exchanger 23, so that the refrigerant condenses and is liquefied into liquid refrigerant at high pressure.

The liquid refrigerant having flowed out of the heat-source-side heat exchanger 23 is decompressed by the expansion device 25 and brought into a two-phase gas-liquid state at low pressure. The refrigerant in the two-phase gas-liquid state flows into the first heat-medium heat exchanger 41*a* and the second heat-medium heat exchanger 41*b*. In the first heat-medium heat exchanger 41*a* and the second heat-medium heat exchanger 41*b*, the refrigerant receives heat from a heat medium and thus becomes low-pressure gas refrigerant. The refrigerant receives heat from the heat medium, and consequently the temperature of the heat medium decreases. The heat medium delivered from the first pump 42*a* and the second pump 42*b* receives heat from the air in a room where the indoor unit 3*a* is installed, so that the air in the room is cooled, and consequently the room temperature decreases. The heat medium having received heat returns to the first heat-medium heat exchanger 41*a* and the second heat-medium heat exchanger 41*b*.

Meanwhile, refrigerant having flowed out of the first heat-medium heat exchanger 41*a* and the second heat-medium heat exchanger 41*b* returns to the compressor 21 via the flow-path switching device 22. While the air-conditioning apparatus 1 is performing cooling operation, a cycle is repeated in which refrigerant discharged from the compressor 21 flows sequentially through the heat-source-side heat exchanger 23, the expansion device 25, and the first heat-medium heat exchangers 41*a* and 41*b*, and is subsequently drawn by the compressor 21. A heat medium circulating through the heat medium circuit 60 repeats a cycle in which the heat medium transfers heat to refrigerant at the first heat-medium heat exchanger 41*a* and the second heat-medium heat exchanger 41*b*, and then receives heat from the air in a room where the indoor unit 3*a* is installed.

Note that in Embodiment 1, descriptions of a case where the air-conditioning apparatus 1 performs heating operation are omitted. When the air-conditioning apparatus 1 performs heating operation, refrigerant flows through the refrigerant circuit 10 in a direction reverse to the flow direction when the air-conditioning apparatus 1 performs cooling operation. In this case, the first heat-medium heat exchanger 41*a* and the second heat-medium heat exchanger 41*b* are each used as a condenser, while the heat-source-side heat exchanger 23 is used as an evaporator. In the heating operation, a heat medium circulating through the heat medium circuit 60 receives heat from refrigerant at the first heat-medium heat exchanger 41*a* and the second heat-medium heat exchanger 41*b*, and then transfers heat to the air in a room where the indoor unit 3*a* is installed.

Figure 3:
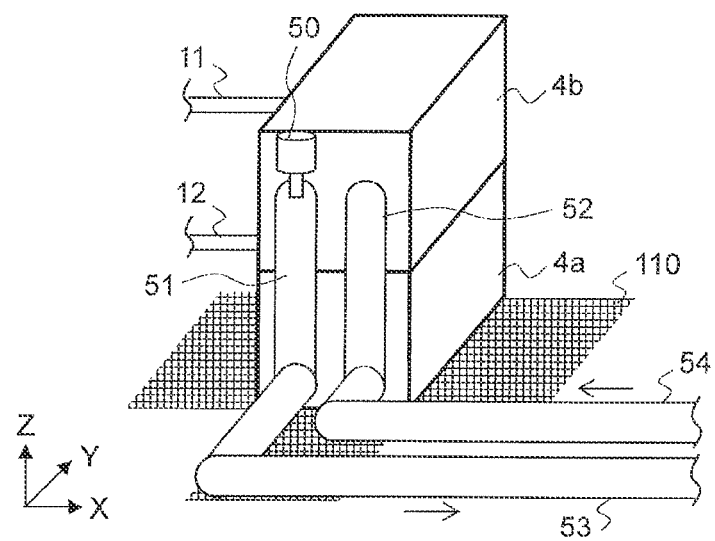
FIG. 3 is an external perspective view illustrating a configuration example of the relay illustrated in FIG. 1.

Next, an installation configuration of the relay 4 according to Embodiment 1 is described. FIG. 3 is an external perspective view illustrating a configuration example of the relay illustrated in FIG. 1. The relay 4 according to Embodiment 1 is assembled such that the first relay unit 4*a* and the second relay unit 4*b* are installed in a direction perpendicular to the floor surface. The first relay unit 4*a* and the second relay unit 4*b* each have, for example, a cuboid housing as illustrated in FIG. 3. In the configuration example illustrated in FIG. 3, the second relay unit 4*b* is installed above or on a top of the first relay unit 4*a*. Even in the installation configuration illustrated in FIG. 3, as the heat medium circuit 60 is formed from a sealed pipe, an increase in pressure difference is avoided between a heat medium flowing through the first relay unit 4*a* and a heat medium flowing through the second relay unit 4*b*.

A collection header 51 illustrated in FIG. 3 is a header to connect the first heat medium pipe 53*a* and the second heat medium pipe 53*b* illustrated in FIG. 1. The collection header 51 combines a heat medium flowing out of the first relay unit 4*a* and a heat medium flowing out of the second relay unit 4*b*, and allows the combined heat media to flow out toward the heat medium pipe 53. A distribution header 52 is a header to branch the heat medium pipe 54 into the first heat medium pipe 54*a* and the second heat medium pipe 54*b* in the configuration illustrated in FIG. 1. The distribution header 52 splits a heat medium flowing through the heat medium pipe 54 into a flow to the first heat medium pipe 54*a* and a flow to the second heat medium pipe 54*b*.

In the configuration illustrated in FIG. 3, the collection header 51 and the distribution header 52 are provided on the relay 4. However, these headers may not be provided on the relay 4. That is, the first heat medium pipe 53*a* and the second heat medium pipe 53*b* may be connected to the heat medium pipe 53, while the first heat medium pipe 54*a* and the second heat medium pipe 54*b* may be connected to the heat medium pipe 54.

As illustrated in FIG. 3, a service space 110 is provided around the relay 4, which is the space necessary for a worker to perform maintenance of the relay 4. In FIG. 3, the service space 110 is shown in a grid pattern. It is understood from FIG. 3 that the necessary space is secured for a worker to perform maintenance of both the first relay unit 4*a* and the second relay unit 4*b*.

Figure 4:
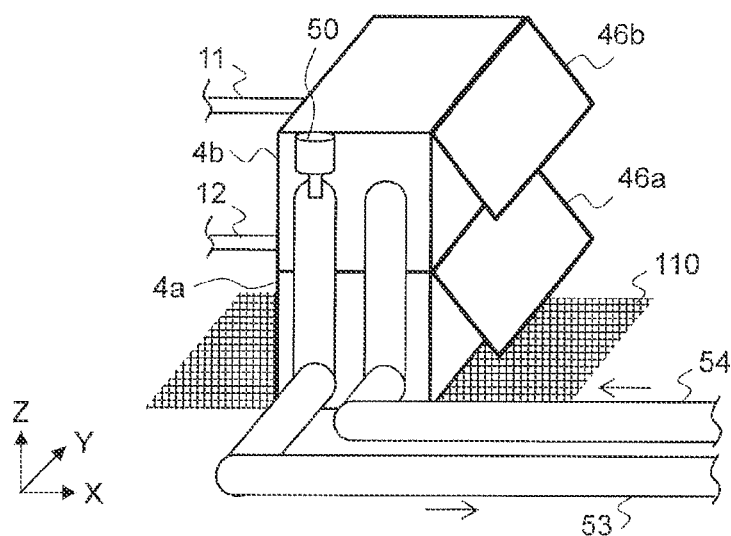
FIG. 4 illustrates the relay with its side panels opened from the state shown in FIG. 3.

FIG. 4 illustrates the relay with its side panels opened from the state shown in FIG. 3. As illustrated in FIG. 4, the first relay unit 4*a* is designed such that a panel 46*a* at one of the four side faces of the housing can be opened toward one direction (X-axis arrow direction). The second relay unit 4*b* is designed such that a panel 46b at one of the four side faces of the housing can be opened toward one direction (X-axis arrow direction). Each of the first relay unit 4a and the second relay unit 4b may be designed such that not only a side panel can be opened toward one direction, but also another side panel can be opened toward a direction opposite to the one direction (toward the direction opposite to the X-axis arrow direction).

Even when the second relay unit 4b is installed above or on the top of the first relay unit 4a as illustrated in FIG. 3, a worker can still open the panel 46a of the first relay unit 4a as illustrated in FIG. 4. With this configuration, a worker can perform maintenance of both the first relay unit 4a and the second relay unit 4b in the service space 110.

Figure 5:
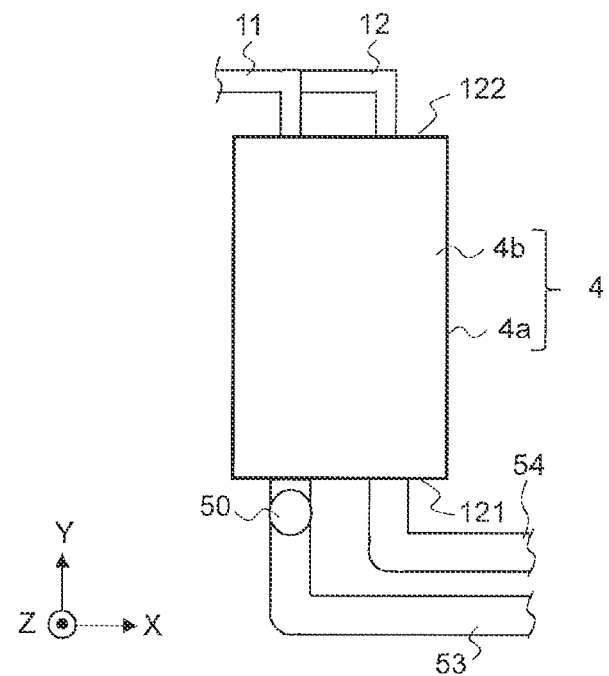
FIG. 5 is a plan view of the relay illustrated in FIG. 3 as an example when the relay is viewed from above.

FIG. 5 is a plan view of the relay illustrated in FIG. 3 as an example when the relay is viewed from above. Although FIG. 5 does not illustrate the first relay unit 4a located below, the heat medium pipes 53 and 54 are connected to the relay 4 on a first face 121 (the face perpendicular to the Y-axis arrow direction) parallel to one side face of the housing of the first relay unit 4a and one side face of the housing of the second relay unit 4b. In the relay 4, the refrigerant pipes 11 and 12 are connected to the relay 4 on a second face 122 (the opposite face perpendicular to the Y-axis arrow direction) facing toward a direction opposite to a direction toward which the first face 121 faces. The heat medium pipes 53 and 54 are connected to the relay 4 collectively on one of the four side faces of the relay 4, so that a worker can easily perform maintenance of the heat medium pipes 53 and 54.

Figure 6:
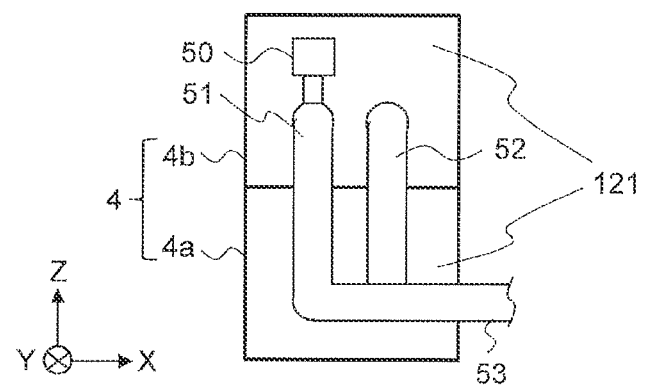
FIG. 6 is a side view of the relay illustrated in FIG. 3 as an example when the relay is viewed from one direction.
Figure 7:
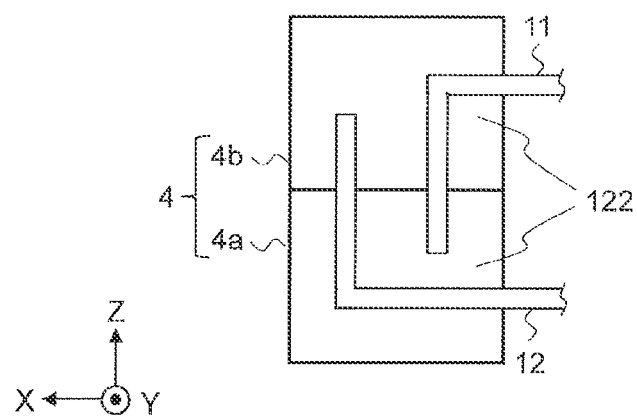
FIG. 7 is a side view of the relay illustrated in FIG. 3 as an example when the relay is viewed from another direction.

FIG. 6 is a side view of the relay shown in FIG. 3 as an example when the relay is viewed from one direction. FIG. 7 is a side view of the relay shown in FIG. 3 as an example when the relay is viewed from another direction. FIG. 6 illustrates the relay 4 when the relay 4 is viewed from a direction toward the first face 121 illustrated in FIG. 5. FIG. 7 illustrates the relay 4 when the relay 4 is viewed from a direction toward the second face 122 illustrated in FIG. 5.

On the first face 121 illustrated in FIG. 6, the heat medium pipe 53 is connected to the first heat medium pipe 53a and the second heat medium pipe 53b illustrated in FIG. 1 through the collection header 51. On the first face 121, the heat medium pipe 54 illustrated in FIG. 1 is connected to the first heat medium pipe 54a and the second heat medium pipe 54b through the distribution header 52. On the second face 122 illustrated in FIG. 7, the refrigerant pipe 11 is connected to the first refrigerant pipe 11a and the second refrigerant pipe 11b illustrated in FIG. 1. On the second face 122, the refrigerant pipe 12 is connected to the first refrigerant pipe 12a and the second refrigerant pipe 12b illustrated in FIG. 1.

Figure 8:
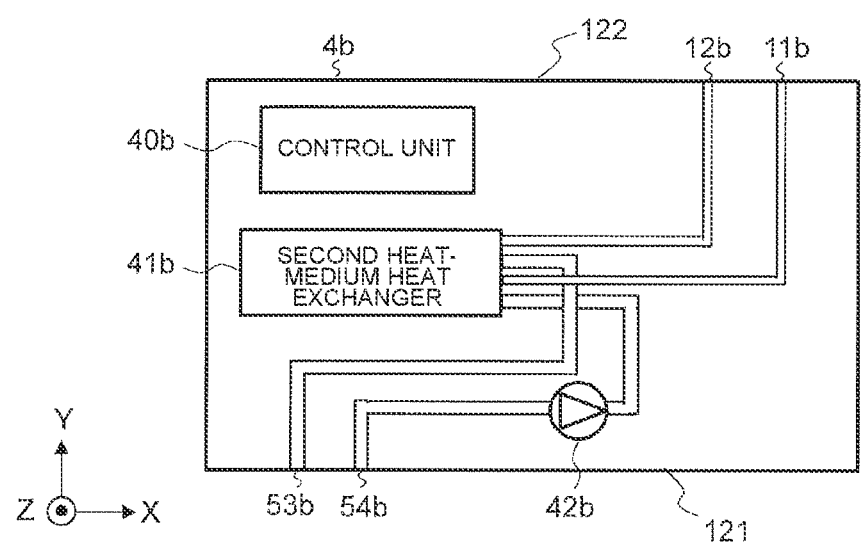
FIG. 8 is a schematic diagram of a second relay illustrated in FIG. 5 when the interior of the second relay is viewed from above.

FIG. 8 is a schematic diagram of a second relay illustrated in FIG. 5 when the interior of the second relay is viewed from above. In the second relay unit 4b, as illustrated in FIG. 8, the second heat medium pipes 53b and 54b are collected on the first face 121, while the second refrigerant pipes 11b and 12b are collected on the second face 122. The first relay unit 4a is also designed in the same manner as the second relay unit 4b.

As described above with reference to FIGS. 5 to 8, heat medium pipes are connected on one of a plurality of side faces of the relay 4, while refrigerant pipes are connected on another one of the side faces, so that the service space 110 can be divided for different types of pipes. Compared to the case where refrigerant pipes are connected on a side face of the relay, and heat medium pipes are also connected on the same side face of the relay as the refrigerant pipes, a worker is prevented from misidentifying the type of pipe. This results in improvement in maintenance efficiency. The first face 121 and the second face 122 are parallel to each other, and the first face 121 and the second face 122 face toward opposite directions and are across the housing of the relay 4. The first face 121 and the second face 122 are parallel to each other, and consequently this improves the effect of preventing the pipes from being incorrectly connected.

Figure 9:
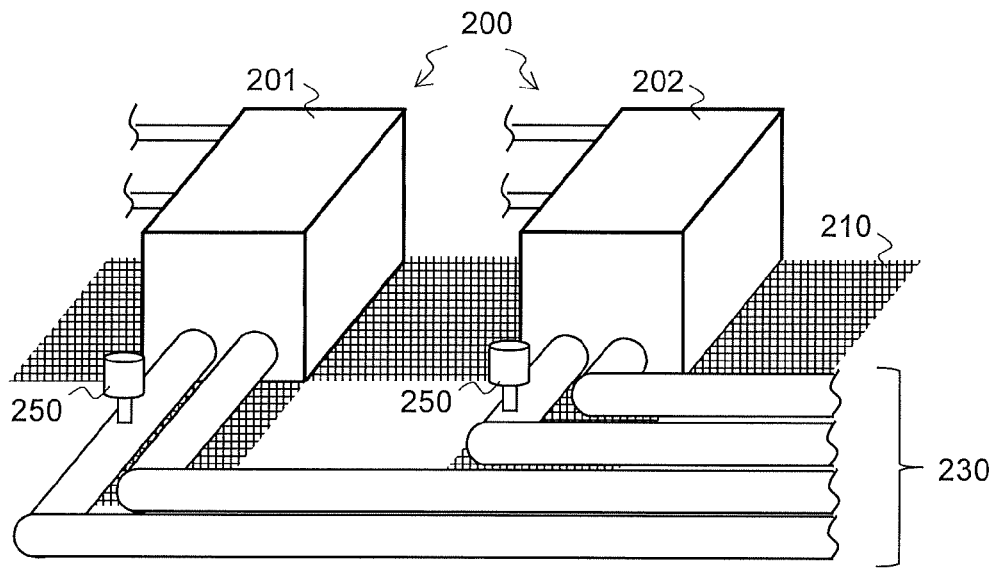
FIG. 9 is an external perspective view illustrating an example of a relay according to Comparative Example.

FIG. 9 is an external perspective view illustrating an example of a relay according to Comparative Example. As illustrated in FIG. 9, a relay 200 according to Comparative Example includes relay units 201 and 202. The relay units 201 and 202 are separately installed on the floor surface. Compared to the relay 200 according to Comparative Example illustrated in FIG. 9, the relay 4 according to Embodiment 1 can reduce its installation area. In Comparative Example illustrated in FIG. 9, the relay units 201 and 202 are connected individually to separate indoor units. That is, a relay unit and an indoor unit are connected in one to one correspondence. In this case, the installation area of heat medium pipes 230 is increased.

The relay 200 according to Comparative Example needs two air vent valves 250. In contrast, the relay 4 according to Embodiment 1 needs only one air vent valve 50 as illustrated in FIG. 3. Further, the relay 200 according to Comparative Example needs a service space 210 shown in a grid pattern in FIG. 9. Compared to the relay 200 according to Comparative Example illustrated in FIG. 9, the relay 4 according to Embodiment 1 can reduce the space necessary for maintenance.

In Embodiment 1, the case has been described where the relay 4 includes two relay units. However, the number of relay units may be three or more. It is desirable for each of the first pump 42a and the second pump 42b to have horsepower of 120 kW or less. In a case where a pump needs horsepower of 200 kW or greater, a larger-diameter heat medium pipe is needed accordingly. In contrast, in the relay 4 according to Embodiment 1, each of the first pump 42a and the second pump 42b has horsepower of, for example, 100 kW, and thus the first pump 42a and the second pump 42b can demonstrate a total 200 kW-horsepower capability. This eliminates the need for a larger-diameter heat medium pipe.

Each of the first pump 42a and the second pump 42b may have different horsepower. In the relay 200 according to Comparative Example illustrated in FIG. 9, as a relay unit and an indoor unit are connected in one to one correspondence, it is necessary for the pump of the relay unit 201 and the pump of the relay unit 202 to have equal horsepower. In Embodiment 1, the first pump 42a and the second pump 42b circulate a heat medium through the heat medium circuit 60 common between the first and second pumps 42a and 42b. It is thus unnecessary for the first pump 42a and the second pump 42b to have equal horsepower.

The relay 4 according to Embodiment 1 includes the first relay unit 4a and the second relay unit 4b to allow refrigerant to circulate between the first relay unit 4a and the outdoor unit 2 and between the second relay unit 4b and the outdoor unit 2, and to allow a heat medium to circulate between the first relay unit 4a and the indoor units 3a and 3b and between the second relay unit 4b and the indoor units 3a and 3b. The second relay unit 4b is installed above or on the top of the first relay unit 4a.

According to Embodiment 1, two relay units are used, so that the flow rate for supplying a heat medium can be increased. In addition, as the two relay units are installed in a direction perpendicular to the floor surface, an increase in the installation area can be avoided. Even when each of the first pump 42a and the second pump 42b has, for example, horsepower of 60 kW, the first and second pumps 42a and 42b with total horsepower of 120 kW can increase the flow rate for supplying a heat medium. As the second relay unit 4b is installed above or on the top of the first relay unit 4a, the installation area of the relay 4 can be reduced. While a space necessary for maintenance of the relay 4 is secured, the space necessary for the maintenance can be reduced.

Embodiment 2

A relay according to Embodiment 2 of the present disclosure includes a stand that supports the second relay unit 4b. In Embodiment 2, detailed descriptions of the configuration identical to that explained in Embodiment 1 are omitted.

Figure 10:
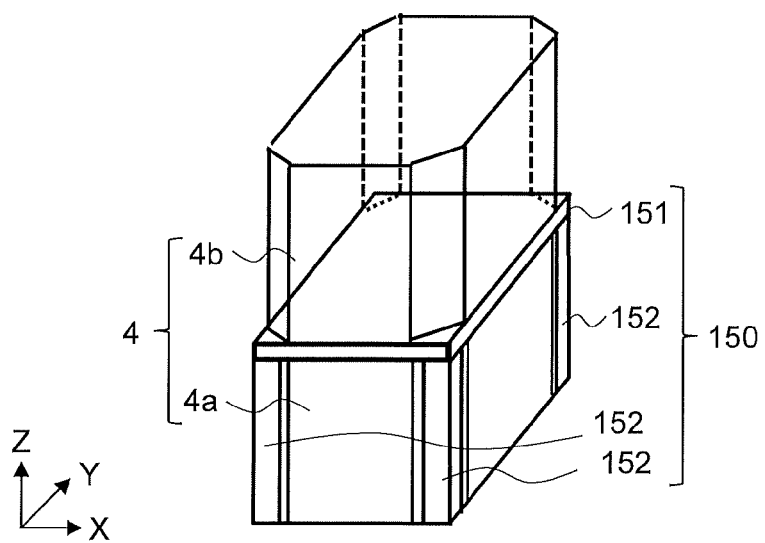
FIG. 10 is an external perspective view illustrating a configuration example of a relay according to Embodiment 2 of the present disclosure.

FIG. 10 is an external perspective view illustrating a configuration example of a relay according to Embodiment 2 of the present disclosure. For descriptions of the configuration of the relay 4 according to Embodiment 2, FIG. 10 omits illustrations of part of the configuration illustrated in FIG. 3. In the relay 4 according to Embodiment 2, four corner portions of each housing of the first relay unit 4a and the second relay unit 4b illustrated in FIG. 3 are removed. Each housing of the first relay unit 4a and the second relay unit 4b has a horizontal face shaped into an octagon. Note that each housing of the first relay unit 4a and the second relay unit 4b is not limited to having a horizontal face shaped into an octagon. For example, each housing of the first relay unit 4a and the second relay unit 4b may have a horizontal face shaped into an ellipse.

The relay 4 according to Embodiment 2 includes a stand 150 made up of a support plate 151 and four leg portions 152. As illustrated in FIG. 10, the stand 150 is installed such that the support plate 151 covers the top face of the first relay unit 4a. The four leg portions 152 are positioned on the outside of the outer periphery of the housing of the first relay unit 4a. The second relay unit 4b is installed on the support plate 151.

Figure 11:
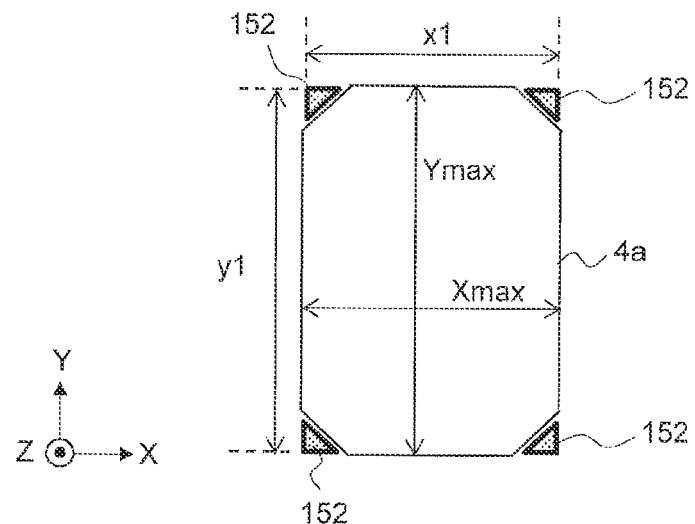
FIG. 11 is a plan view of a first relay unit of the relay illustrated in FIG. 10 as an example when the first relay unit is viewed from above with a support plate removed.

FIG. 11 is a plan view of a first relay unit of the relay shown in FIG. 10 as an example when the first relay unit is viewed from above with a support plate removed. As illustrated in FIG. 11, in a first direction (X-axis arrow direction) parallel to the floor surface, a distance x1 between two adjacent leg portions 152 is shorter than or equal to a maximum value Xmax of the length of the housing of the first relay unit 4a. In a second direction (Y-axis arrow direction) parallel to the floor surface and perpendicular to the first direction, a distance y1 between two adjacent leg portions 152 is shorter than or equal to a maximum value Ymax of the length of the housing of the first relay unit 4a. In a case where each housing of the first relay unit 4a and the second relay unit 4b has a horizontal face shaped into an ellipse, the maximum value Xmax refers to a length of the minor axis of the ellipse, while the maximum value Ymax refers to a length of the major axis of the ellipse.

According to Embodiment 2, the leg portions 152 of the stand 150 fit into the length of the housing of the first relay unit 4a in the first direction and into the length of the housing of the first relay unit 4a in the second direction. Thus, even when the stand 150 that supports the second relay unit 4b is provided, the relay 4 can still avoid an increase in its installation area. In this case, it is unnecessary to consider the weight of the second relay unit 4b in strength design of the housing of the first relay unit 4a installed under the second relay unit 4b.

Modification 1

Figure 12:
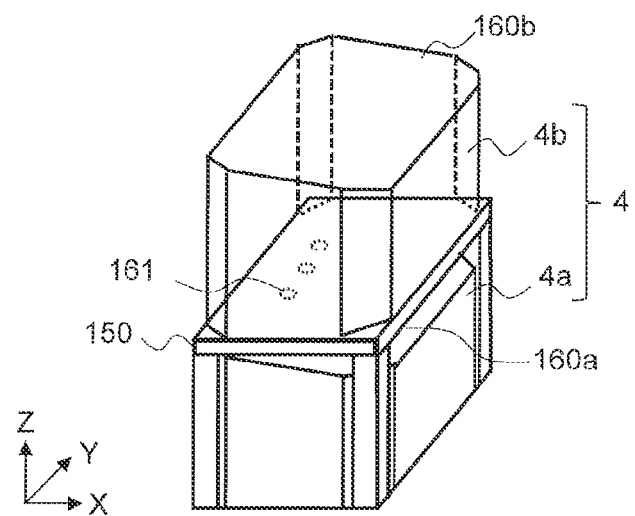
FIG. 12 is an external perspective view illustrating a configuration example of a relay according to Modification 1.

In a configuration according to Modification 1, a top plate 160a of the first relay unit 4a is inclined. FIG. 12 is an external perspective view illustrating a configuration example of a relay according to Modification 1. As illustrated in FIG. 12, the top plate 160a of the first relay unit 4a is inclined. In the configuration example illustrated in FIG. 12, the top plate 160a is inclined in the X-axis arrow direction. Opening ports 161 are provided in a bottom plate of the second relay unit 4b. While FIG. 12 illustrates three opening ports 161, at least one opening port 161 is only required to be provided.

In Modification 1, when condensation has occurred on the second heat-medium heat exchanger 41b illustrated in FIG. 1, condensed water passes through the opening ports 161 and drops on the top plate 160a. The top plate 160a is used as a drain pan. Note that when a groove is provided at the lowest end portion of the top plate 160a and a drain pipe is connected to the groove, condensed water can be collected and drained. The drain pipe may be provided with a pump. A top plate 160b of the second relay unit 4b may also be inclined.

As illustrated in FIGS. 10 and 12, a housing common to the first relay unit 4a and the second relay unit 4b is used. This can reduce production costs compared to the case where multiple types of units are produced.

Embodiment 3

In Embodiment 3, the collection header 51 and the distribution header 52 are provided inside a relay. In Embodiment 3, detailed descriptions of the configuration identical to that explained in Embodiment 1 and Embodiment 2 are omitted.

Figure 13:
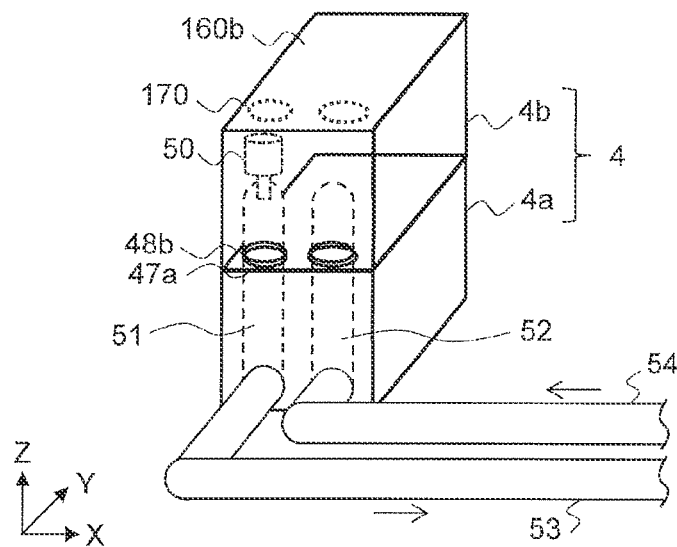
FIG. 13 is an external perspective view illustrating a configuration example of a relay according to Embodiment 3 of the present disclosure.

FIG. 13 is an external perspective view illustrating a configuration example of a relay according to Embodiment 3 of the present disclosure. For descriptions of the configuration of the relay 4 according to Embodiment 3, FIG. 13 omits illustrations of part of the configuration illustrated in FIG. 3.

As illustrated in FIG. 13, two first opening ports 47a are provided in a top plate of the first relay unit 4a. In a bottom plate of the second relay unit 4b, two second opening ports 48b are provided at positions where the two second opening ports 48b face the two first opening ports 47a. The collection header 51 is installed to extend through the first opening port 47a and the second opening port 48b. The distribution header 52 is also installed to extend through the other first opening port 47a and the other second opening port 48b.

According to Embodiment 3, as the collection header 51 and the distribution header 52 are provided inside the relay 4, the relay 4 can also be installed outdoors. The collection header 51, the air vent valve 50, and the distribution header 52 are provided inside the relay 4, and consequently can be prevented from being affected by weather conditions such as rain and wind.

In the top plate 160b of the second relay unit 4b illustrated in FIG. 13, temporary caps 170 are provided to seal opening ports formed in the top plate 160b. The opening ports with a shape shown by the dotted lines in FIG. 13 are formed in the top plate 160b by striking the temporary caps 170 with a hammer or other tool. The two first opening ports 47a are formed at the time of producing the relay 4, and then covered with the temporary caps 170. When installing the relay 4, a worker strikes the two temporary caps 170 with a hammer or other tool and removes the temporary caps 170, so that the two first opening ports 47a are formed as illustrated in FIG. 13.

In the manner as described above, at the time of installing the relay 4, a worker can select whether to provide the collection header 51 and the distribution header 52 inside or outside the relay 4 depending on the installation environment of the relay 4. In Embodiment 3, the case has been described where the collection header 51 and the distribution header 52 are provided inside the relay 4. However, one of the collection header 51 and the distribution header 52 may be provided inside the relay 4. The second opening ports 48b may be provided at the time of producing the relay 4, or may also be formed by removing the temporary caps 170 at the time of installing the relay 4.

Modification 2

Figure 14:
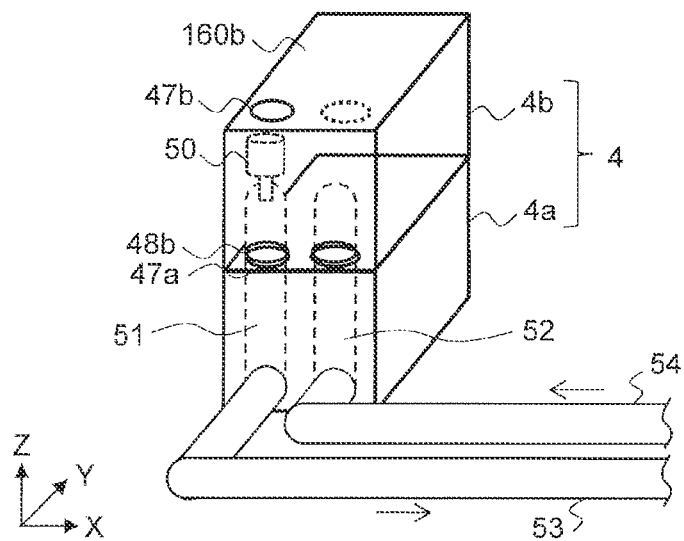
FIG. 14 is an external perspective view illustrating a configuration example of a relay according to Modification 2.

In a configuration according to Modification 2, opening ports are provided in the top plate 160b of the second relay unit 4b. FIG. 14 is an external perspective view illustrating a configuration example of a relay according to Modification 2. As illustrated in FIG. 14, in Modification 2, a first opening port 47b is provided in the top plate 160b of the second relay unit 4b by removing one of the temporary caps 170 illustrated in FIG. 13. The first opening port 47b is provided at a position where the first opening port 47b faces the air vent valve 50.

According to Modification 2, a worker can remove air by operating the air vent valve 50 from above the second relay unit 4b.

Embodiment 4

In Embodiment 4, in a case where each of the first pump 42a and the second pump 42b has different horsepower, the controller 20 controls the rotation frequency of the first pump 42a and the rotation frequency of the second pump 42b. In Embodiment 4, a case is described where the first pump 42a has horsepower greater than does the second pump 42b. In Embodiment 4, detailed descriptions of the configuration identical to that explained in Embodiment 1 to Embodiment 3 are omitted.

Figure 15:
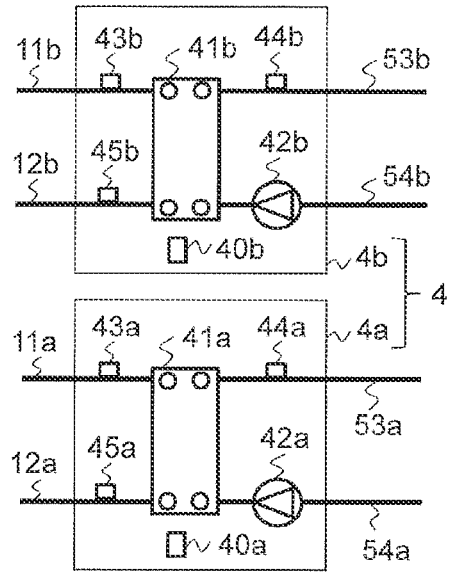
FIG. 15 illustrates a configuration example of a relay according to Embodiment 4 of the present disclosure.

The configuration of the relay according to Embodiment 4 is described below. FIG. 15 illustrates a configuration example of a relay according to Embodiment 4 of the present disclosure. The first relay unit 4a is provided with first temperature sensors 43a and 45a, each of which is configured to detect a temperature of refrigerant flowing out of the first heat-medium heat exchanger 41a, and a first flow-rate detection unit 44a configured to detect the flow rate of a heat medium flowing to the first heat-medium heat exchanger 41a. The first flow-rate detection unit 44a is configured to detect the flow rate of a heat medium flowing through the first relay unit 4a. The second relay unit 4b is provided with second temperature sensors 43b and 45b, each of which is configured to detect a temperature of refrigerant flowing out of the second heat-medium heat exchanger 41b, and a second flow-rate detection unit 44b configured to detect the flow rate of a heat medium flowing to the second heat-medium heat exchanger 41b. The second flow-rate detection unit 44b is configured to detect the flow rate of a heat medium flowing through the second relay unit 4b. The first flow-rate detection unit 44a and the second flow-rate detection unit 44b are each, for example, a flowmeter.

In the configuration example illustrated in FIG. 15, the first flow-rate detection unit 44a is provided to the first heat medium pipe 53a. The second flow-rate detection unit 44b is provided to the second heat medium pipe 53b. The first temperature sensor 43a is provided to the first refrigerant pipe 11a. The first temperature sensor 45a is provided to the first refrigerant pipe 12a. The second temperature sensor 43b is provided to the second refrigerant pipe 11b. The second temperature sensor 45b is provided to the second refrigerant pipe 12b.

Figure 16:
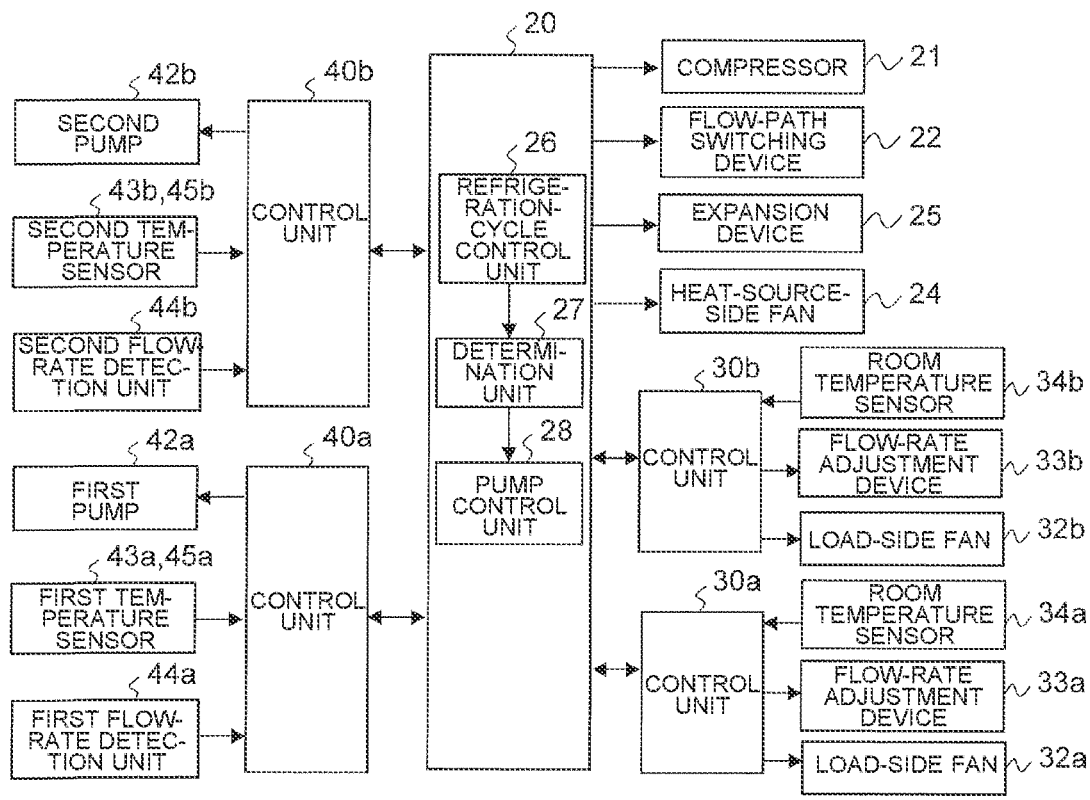
FIG. 16 illustrates a configuration of control in an air-conditioning apparatus according to Embodiment 4 of the present disclosure.

FIG. 16 illustrates a configuration of control in an air-conditioning apparatus according to Embodiment 4 of the present disclosure. The controller 20 includes a refrigeration-cycle control unit 26 configured to control the refrigeration cycle of the refrigerant circuit 10, a determination unit 27, and a pump control unit 28. In cooling operation, the determination unit 27 determines whether a temperature difference Td between a value detected by the first temperature sensor 43a and a value detected by the second temperature sensor 43b is larger than or equal to a temperature threshold Tth determined. In heating operation, the determination unit 27 determines whether the temperature difference Td between a value detected by the first temperature sensor 45a and a value detected by the second temperature sensor 45b is larger than or equal to the temperature threshold Tth. The determination unit 27 determines whether a flow-rate difference FLd between a value detected by the first flow-rate detection unit 44a and a value detected by the second flow-rate detection unit 44b is larger than or equal to a flow-rate threshold FLth determined.

When the temperature difference Td is larger than or equal to the temperature threshold Tth, it is conceivable that the second pump 42b cannot deliver a heat medium sufficiently, the second heat-medium heat exchanger 41b cannot sufficiently exchange heat between refrigerant and the heat medium, and consequently the heat medium boils or freezes in the second heat-medium heat exchanger 41b. When the flow-rate difference FLd is larger than or equal to the flow-rate threshold FLth determined, it is also conceivable that the second pump 42b cannot deliver a heat medium sufficiently.

When the determination unit 27 determines that the temperature difference Td is larger than or equal to the temperature threshold Tth, the pump control unit 28 decreases the rotation frequency of the first pump 42a. When the determination unit 27 determines that the flow-rate difference FLd is larger than or equal to the flow-rate threshold FLth, the pump control unit 28 decreases the rotation frequency of the first pump 42a.

The first flow-rate detection unit 44a and the second flow-rate detection unit 44b are each not limited to a flowmeter. Each of the first flow-rate detection unit 44a and the second flow-rate detection unit 44b may include, for example, two pressure sensors, instead of flowmeters. The flow rate of a heat medium is calculated on the basis of a pressure difference between values detected by the two pressure sensors.

Figure 17:
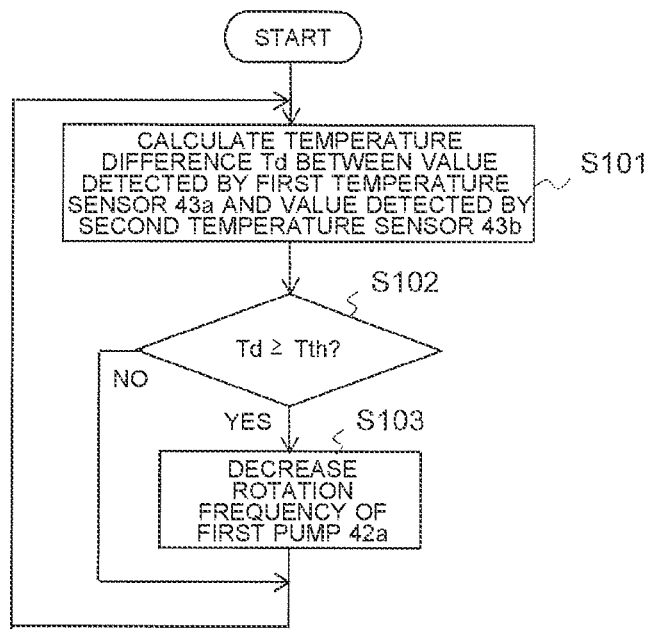
FIG. 17 is a flowchart illustrating an operating procedure for the air-conditioning apparatus according to Embodiment 4 of the present disclosure.

Next, operation of the air-conditioning apparatus 1 according to Embodiment 4 is described. A case is described below where the air-conditioning apparatus 1 performs cooling operation. FIG. 17 is a flowchart illustrating an operating procedure for the air-conditioning apparatus according to Embodiment 4 of the present disclosure. The determination unit 27 calculates the temperature difference Td between a value detected by the first temperature sensor 43a and a value detected by the second temperature sensor 43b (step S101). The determination unit 27 determines whether the temperature difference Td is larger than or equal to the temperature threshold Tth (step S102). When a result of the determination in step S102 shows that the temperature difference Td is larger than or equal to the temperature threshold Tth, the pump control unit 28 decreases the rotation frequency of the first pump 42a (step S103). In contrast, when a result of the determination in step S102 shows that the temperature difference Td is smaller than the temperature threshold Tth, the determination unit 27 returns to step S101.

Through the procedure illustrated in FIG. 17, the second pump 42b is allowed to deliver a heat medium sufficiently when it is conceivable that the heat medium boils or freezes in the second heat-medium heat exchanger 41b. This results in improvement in heat exchange efficiency in the second heat-medium heat exchanger 41b.

Figure 18:
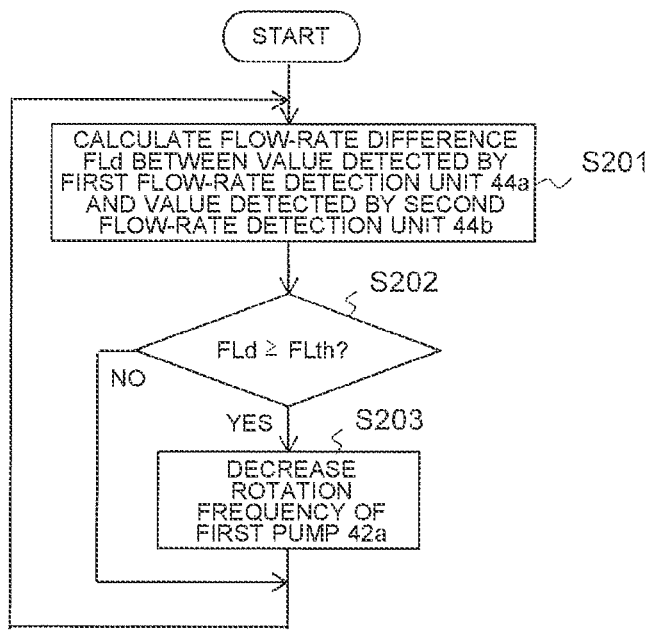
FIG. 18 is a flowchart illustrating another operating procedure for the air-conditioning apparatus according to Embodiment 4 of the present disclosure.

Next, another operation of the air-conditioning apparatus 1 according to Embodiment 4 is described. FIG. 18 is a flowchart illustrating another operating procedure for the air-conditioning apparatus according to Embodiment 4 of the present disclosure. The determination unit 27 calculates the flow-rate difference FLd between a value detected by the first flow-rate detection unit 44a and a value detected by the second flow-rate detection unit 44b (step S201). The determination unit 27 determines whether the flow-rate difference FLd is larger than or equal to the flow-rate threshold FLth (step S202). When a result of the determination in step S202 shows that the flow-rate difference FLd is larger than or equal to the flow-rate threshold FLth, the pump control unit 28 decreases the rotation frequency of the first pump 42a (step S203). In contrast, when a result of the determination in step S202 shows that the flow-rate difference FLd is smaller than the flow-rate threshold FLth, the determination unit 27 returns to step S201.

Through the procedure illustrated in FIG. 18, the second pump 42b is allowed to deliver a heat medium sufficiently when it is conceivable that the heat medium does not flow smoothly through the heat medium circuit 60 including the second heat-medium heat exchanger 41b. This results in improvement in heat exchange efficiency in the second heat-medium heat exchanger 41b.

Note that in Embodiment 4, the case has been described where the controller 20 controls the rotation frequency of the first pump 42a, however, the control unit 40a or the control unit 40b may control the rotation frequency of the first pump 42a. For example, the control unit 40a can control the rotation frequency of the first pump 42a by receiving values detected by various types of sensors provided in the second relay unit 4b through the control unit 40b and the controller 20.

The relay 4 according to Embodiment 4 includes the determination unit 27 and the pump control unit 28. The determination unit 27 calculates one or both of the temperature difference Td in refrigerant and the flow-rate difference FLd in heat medium in the first relay unit 4a and the second relay unit 4b. The determination unit 27 determines whether the flow-rate difference FLd is larger than or equal to the flow-rate threshold FLth, and whether the temperature difference Td is larger than or equal to the temperature threshold Tth. When results of the determinations show that one or both of the conditions that the flow-rate difference FLd is larger than or equal to the flow-rate threshold FLth, and that the temperature difference Td is larger than or equal to the temperature threshold Tth are satisfied, the pump control unit 28 decreases the rotation frequency of the first pump 42a.

In a case where the flow rate for supplying a heat medium from the first pump 42a is so high that the second pump 42b cannot sufficiently deliver a heat medium, there is a possibility that the second heat-medium heat exchanger 41b may not sufficiently exchange heat between refrigerant and the heat medium. In Embodiment 4, one or both of the parameters are monitored, which are the temperature of refrigerant flowing out of the second heat-medium heat exchanger 41b and the flow rate of a heat medium flowing through the second relay unit 4b. When the parameter is decreased, the rotation frequency of the first pump 42a is reduced. Consequently, the second pump 42b is allowed to sufficiently deliver a heat medium, and heat exchange efficiency in the second heat-medium heat exchanger 41b improves accordingly. This results in a reduction in the overall power consumption of the air-conditioning apparatus 1.

In Embodiment 4, two pumps with different horsepower can be installed separately in two relay units. This provides a wide range of choice of pumps to be installed depending on the required horsepower. Further, in Embodiment 4, the first pump 42a has horsepower greater than does the second pump 42b. The first pump 42a with a weight greater than that of the second pump 42b is installed under the second pump 42b. Therefore, this improves physical stability of the relay 4.

REFERENCE SIGNS LIST 1 air-conditioning apparatus 2 outdoor unit 3a, 3b indoor unit 4 relay
4a first relay unit 4b second relay unit 10 refrigerant circuit 11 refrigerant pipe 11a first refrigerant pipe 11b second refrigerant pipe 12 refrigerant pipe 12a first refrigerant pipe 12b second refrigerant pipe 20 controller 21 compressor 22 flow-path switching device 23 heat-source-side heat exchanger 24 heat-source-side fan 25 expansion device 26 refrigeration-cycle control unit 27 determination unit 28 pump control unit
30a, 30b control unit 31a, 31b load-side heat exchanger 32a, 32b load-side fan 33a, 33b flow-rate adjustment device 34a, 34b room temperature sensor 40a, 40b control unit 41a first heat-medium heat exchanger 41b second heat-medium heat exchanger 42a first pump 42b second pump 43a first temperature sensor 43b second temperature sensor
44a first flow-rate detection unit 44b second flow-rate detection unit
45a first temperature sensor 45b second temperature sensor 46a, 46b panel 47a, 47b first opening port 48b second opening port 50 air vent valve 51 collection header 52 distribution header 53 heat medium pipe
53a first heat medium pipe 53b second heat medium pipe 54 heat medium pipe 54a first heat medium pipe 54b second heat medium pipe 60 heat medium circuit 80, 81a, 81b, 82a, 82b CPU 90, 91a, 91b, 92a, 92b memory 110 service space 121 first face 122 second face 150 stand 151 support plate 152 leg portion 160a, 160b top plate 161 opening port 170 temporary cap 200 relay 201 relay unit 210 service space
230 heat medium pipe 250 air vent valve

The invention claimed is:

1. A relay comprising:
a first relay unit comprising a first heat-medium heat exchanger that exchanges heat between refrigerant and heat medium provided between an outdoor unit and an indoor unit and a second relay unit comprising a second heat-medium heat exchanger that exchanges heat between the refrigerant and the heat medium provided between the outdoor unit and the indoor unit;
a refrigerant circuit connecting the first relay unit and the second relay unit to the outdoor unit and configured to circulate the refrigerant; and
a heat medium circuit connecting the first relay unit and the second relay unit to the indoor unit and configured to circulate the heat medium,
the second relay unit being installed above or on a top of the first relay unit, wherein the first relay unit includes a first pump configured to circulate the heat medium between the indoor unit and the first relay unit, the second relay unit includes a second pump configured to circulate the heat medium between the indoor unit and the second relay unit, and each of the first pump and the second pump has different horsepower.

2. The relay of claim 1, comprising a stand including four leg portions and supporting the second relay unit on a floor surface on which the first relay unit is installed, wherein the four leg portions are positioned on an outside of an outer periphery of a housing of the first relay unit, in a first direction parallel to the floor surface, a distance between two of the four leg portions, the two of the four leg portions being adjacent to each other along the outer periphery, is shorter than or equal to a maximum value of a length of the housing of the first relay unit, and in a second direction parallel to the floor surface and perpendicular to the first direction, a distance between two of the four leg portions, the two of the four leg portions being adjacent to each other along the outer periphery, is shorter than or equal to a maximum value of a length of the housing of the first relay unit.

3. The relay of claim 2, wherein an opening port is provided in a bottom plate of the second relay unit, and a top plate of the first relay unit is inclined to a plane parallel to the floor surface.

4. The relay of claim 1, further comprising a first face and a second face which is a face different from the first face, wherein the first relay unit is provided with a first refrigerant pipe connected to the outdoor unit and configured to circulate the refrigerant between the outdoor unit and the first relay unit, and a first heat medium pipe connected to the indoor unit and configured to circulate the heat medium between the indoor unit and the first relay unit, the second relay unit is provided with a second refrigerant pipe connected to the outdoor unit and configured to circulate the refrigerant between the outdoor unit and the second relay unit, and a second heat medium pipe connected to the indoor unit and configured to circulate the heat medium between the indoor unit and the second relay unit, a first side face of a housing of the first relay unit on which the first heat medium pipe is connected to the first relay unit and a first side face of a housing of the second relay unit on which the second heat medium pipe is connected to the second relay unit are parallel to each other and are located on the first face, and a second side face of the housing of the first relay unit on which the first refrigerant pipe is connected to the first relay unit and a second side face of the housing of the second relay unit on which the second refrigerant pipe is connected to the second relay unit are parallel to each other and are located on the second face.

5. The relay of claim 4, wherein the first face and the second face are parallel to each other.

6. The relay of claim 4, wherein a first opening port is provided in a top plate of the first relay unit, a second opening port is provided in a bottom plate of the second relay unit at a position where the second opening port faces the first opening port, and the relay comprises a header extending through the first opening port and the second opening port to connect the first heat medium pipe and the second heat medium pipe.

7. The relay of claim 6, wherein the header is provided with an air vent valve, and a first opening port is provided in a top plate of the second relay unit at a position where the first opening port faces the air vent valve.

8. The relay of claim 1, wherein each of the first pump and the second pump has horsepower of 120 kW or less.

9. The relay of claim 1, wherein the first pump has horsepower greater than does the second pump.

10. The relay of claim 9, wherein the relay comprises a first temperature sensor configured to detect a temperature of the refrigerant flowing out of the first heat-medium heat exchanger, a second temperature sensor configured to detect a temperature of the refrigerant flowing out of the second heat-medium heat exchanger, and a controller configured to control a rotation frequency of the first pump, and the controller is configured to determine whether a temperature difference between a value detected by the first temperature sensor and a value detected by the second temperature sensor is larger than or equal to a temperature threshold determined, and configured to decrease a rotation frequency of the first pump when the controller determines that the temperature difference is larger than or equal to the temperature threshold.

11. The relay of claim 9, comprising:

a first flowmeter configured to detect a flow rate of the heat medium flowing through the first relay unit;

a second flowmeter configured to detect a flow rate of the heat medium flowing through the second relay unit; and a controller configured to control a rotation frequency of the first pump, wherein the controller is configured to determine whether a flow-rate difference between a value detected by the first flowmeter and a value detected by the second flowmeter is larger than or equal to a flow-rate threshold determined, and configured to decrease a rotation frequency of the first pump when the controller determines that the flow-rate difference is larger than or equal to the flow-rate threshold.

* * * * *